United States Patent
Horii et al.

(10) Patent No.: US 6,573,931 B1
(45) Date of Patent: *Jun. 3, 2003

(54) INFORMATION TRANSMISSION METHOD AND APPARATUS

(75) Inventors: Hiroyuki Horii, Kawasaki (JP); Yoshito Haba, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,995

(22) Filed: Apr. 18, 1997

(30) Foreign Application Priority Data

Apr. 19, 1996 (JP) .............................. 8-098672
Jun. 18, 1996 (JP) .............................. 8-156792

(51) Int. Cl.$^7$ .............................. H04N 5/232
(52) U.S. Cl. .............................. 348/211.14; 348/211.5; 348/211.9
(58) Field of Search ................. 348/207, 211, 348/212, 213, 214, 294, 9, 13, 14, 15, 143, 151, 461–468, 14.01, 14.05, 14.12, 211.99, 211.1, 211.4, 211.5, 211.6, 211.9, 211.11, 211.14

(56) References Cited

U.S. PATENT DOCUMENTS

| 3,916,436 A | * 10/1975 | Marey et al. ............... 348/212 |
|---|---|---|
| 4,539,595 A | * 9/1985 | Warner ..................... 348/211.5 |
| 5,821,995 A | * 10/1998 | Nisikawa ............... 348/211.11 |
| 5,838,368 A | * 11/1998 | Masunaga et al. .......... 348/211 |
| 5,978,651 A | * 11/1999 | Eto ......................... 348/211.5 |
| 6,084,631 A | * 7/2000 | Tonkin .................... 348/211.6 |

FOREIGN PATENT DOCUMENTS

| JP | PTO 99-2546 | * 3/1987 | .......... H04N/5/232 |
|---|---|---|---|
| JP | 62-67975 | * 3/1987 | .......... H04N/5/232 |

OTHER PUBLICATIONS

Smith et al., "Digital Data Over Video Channels: Techniques for Spacelab", IEEE AES Systems Magazine, pp. 16–24, Apr. 1993.*

Dumoulin (complier), "Information Content from NSTS Shuttle Reference Manual", pp. 1–18, 1988.*

* cited by examiner

Primary Examiner—Ngoc-Yen Vu
(74) Attorney, Agent, or Firm—Morgan & Finnegan, L.L.P.

(57) ABSTRACT

An information processing method and apparatus of this invention are a method and apparatus for multiplexing data indicating information other than video information on a video signal and transmitting the multiplexed data. Modulated data is formed by inputting the data and modulating the input data. The video signal and the modulated data are input, and the modulated data is multiplexed on the input video signal. When the multiplexed data is output, the modulation mode or the multiplexing interval of the modulated data is controlled in correspondence with the type of input data, thus realizing a function of multiplexing data on a video signal and transmitting the multiplexed data in correspondence with the data type with a simple, small-scale circuit arrangement.

4 Claims, 13 Drawing Sheets

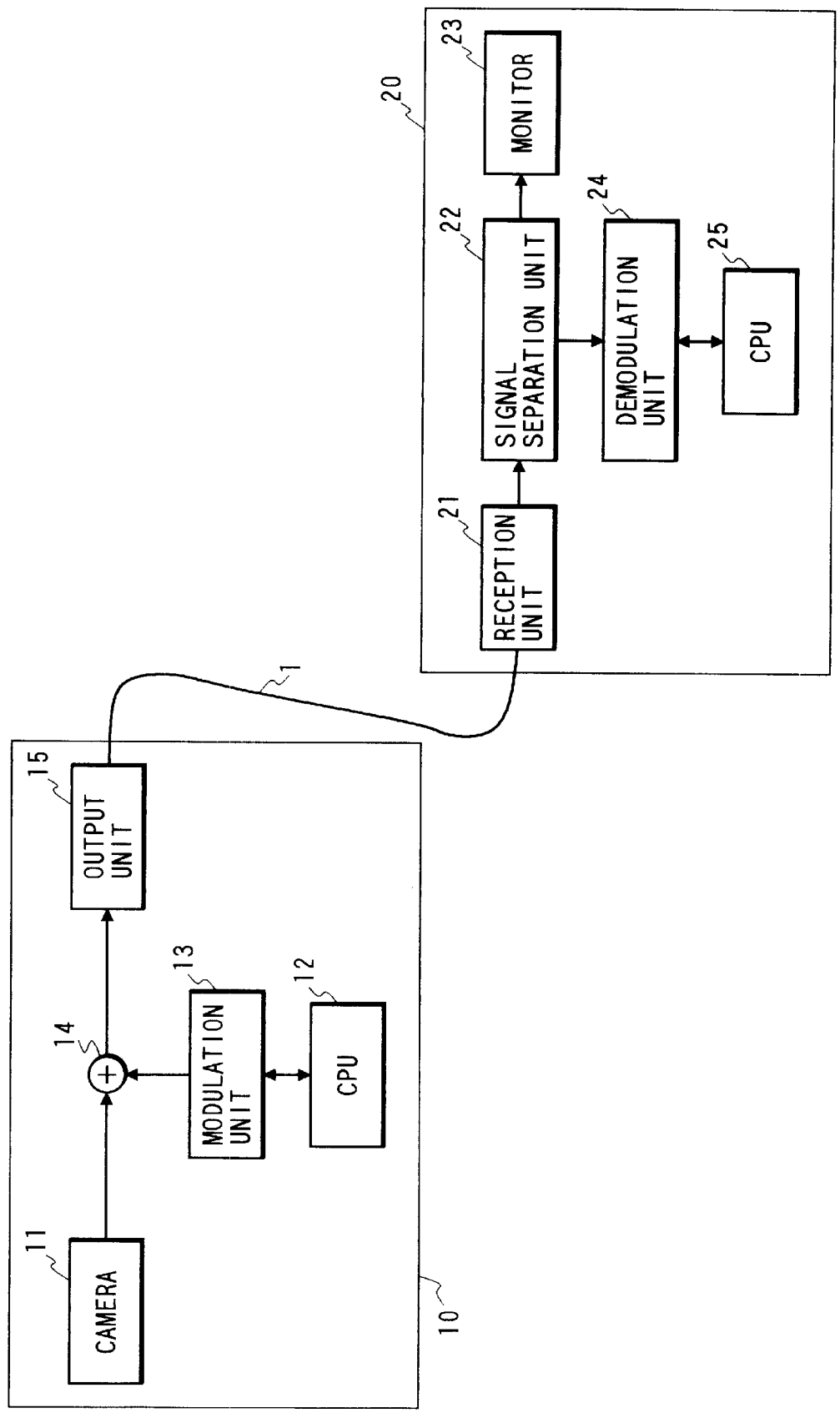

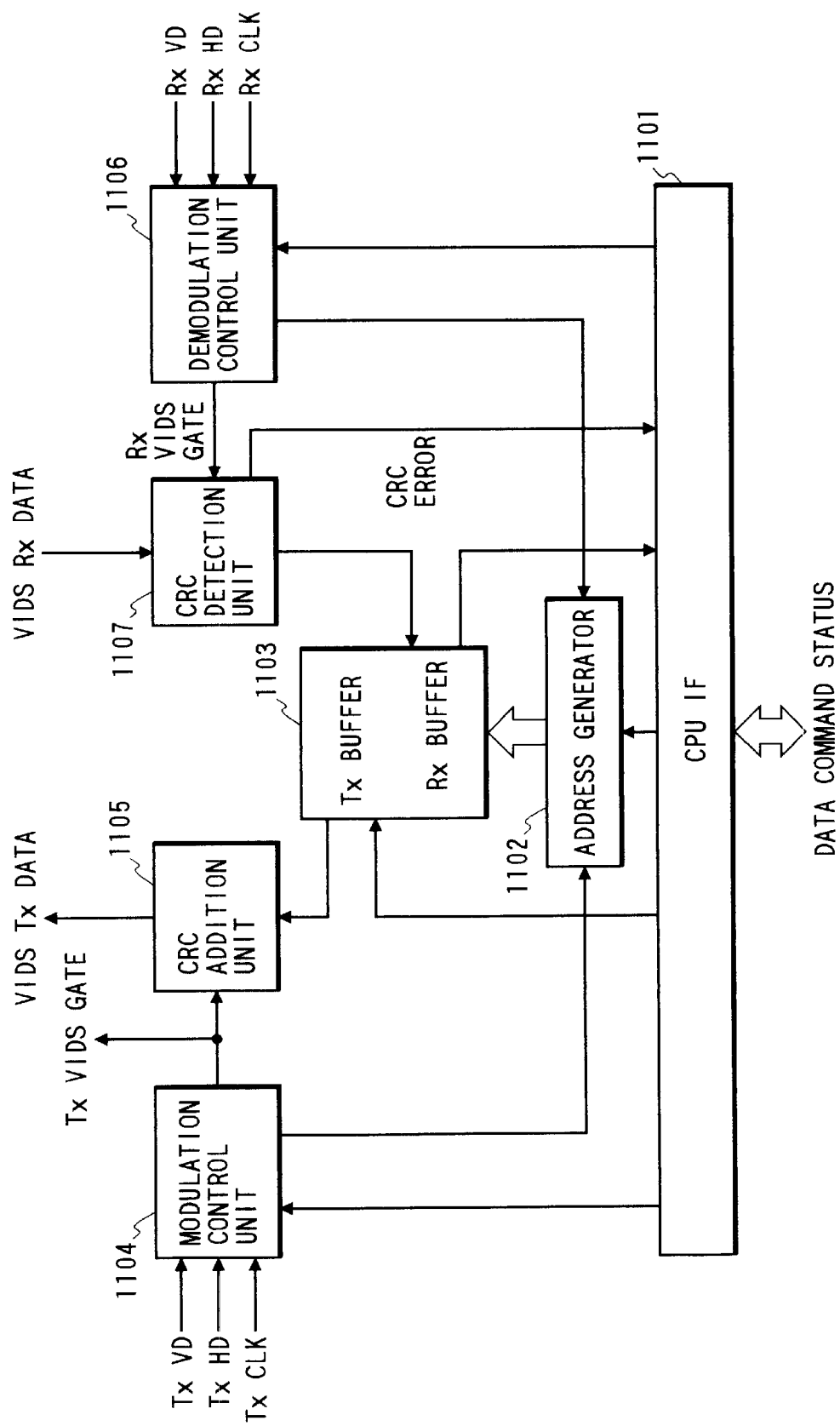

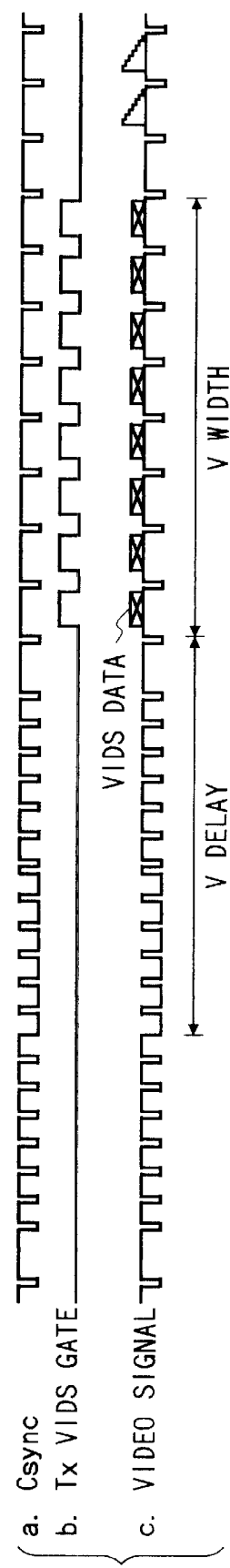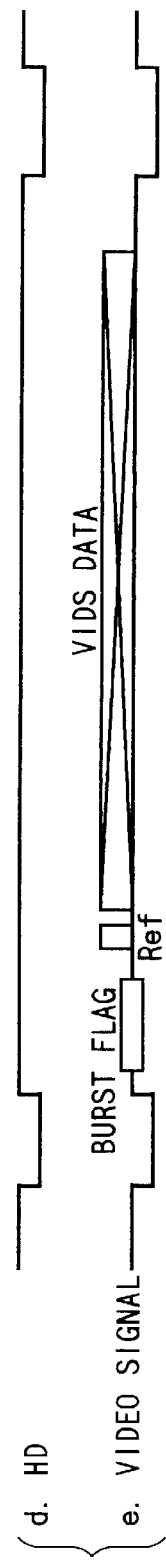

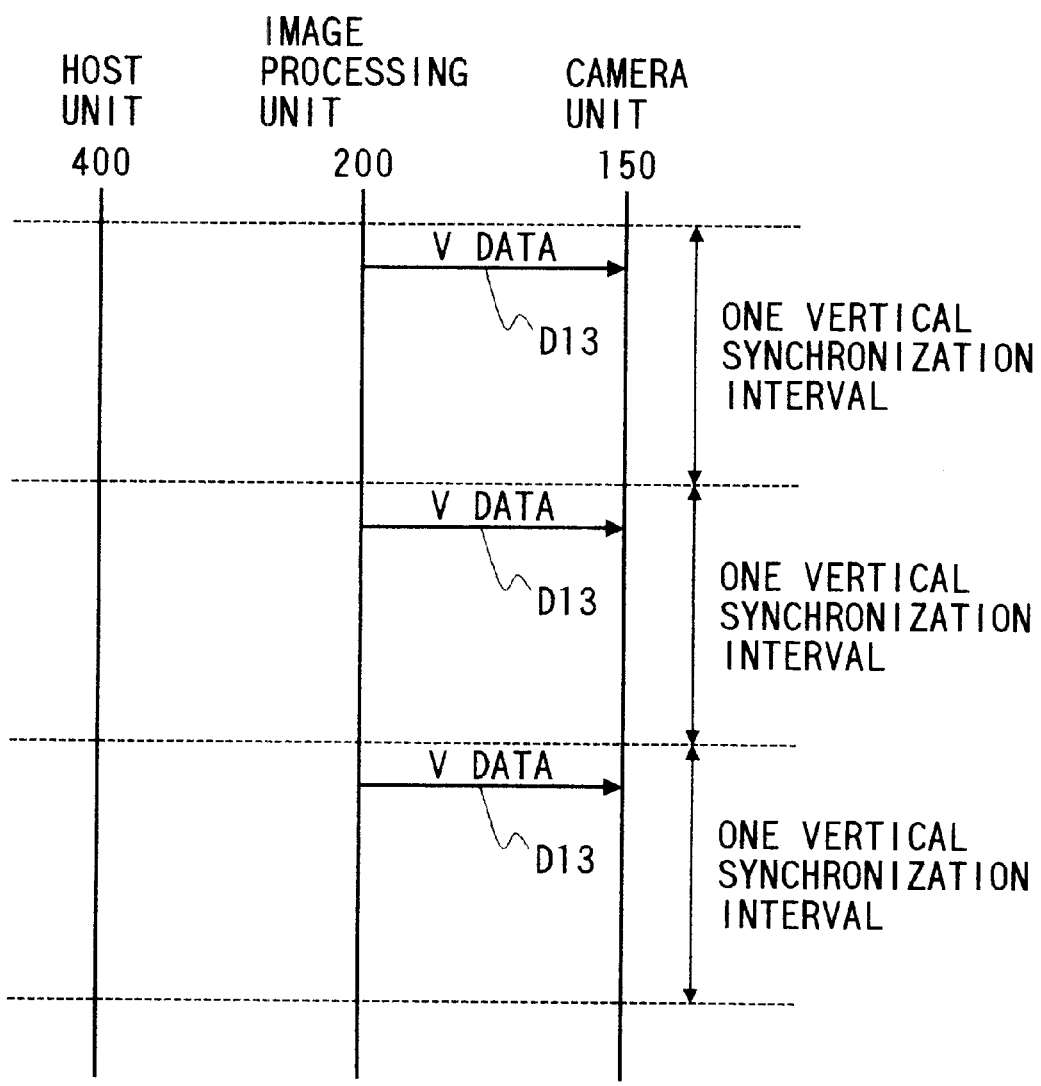

PARAMETER
 00h : OK
 OTHER THAN 00h : NG

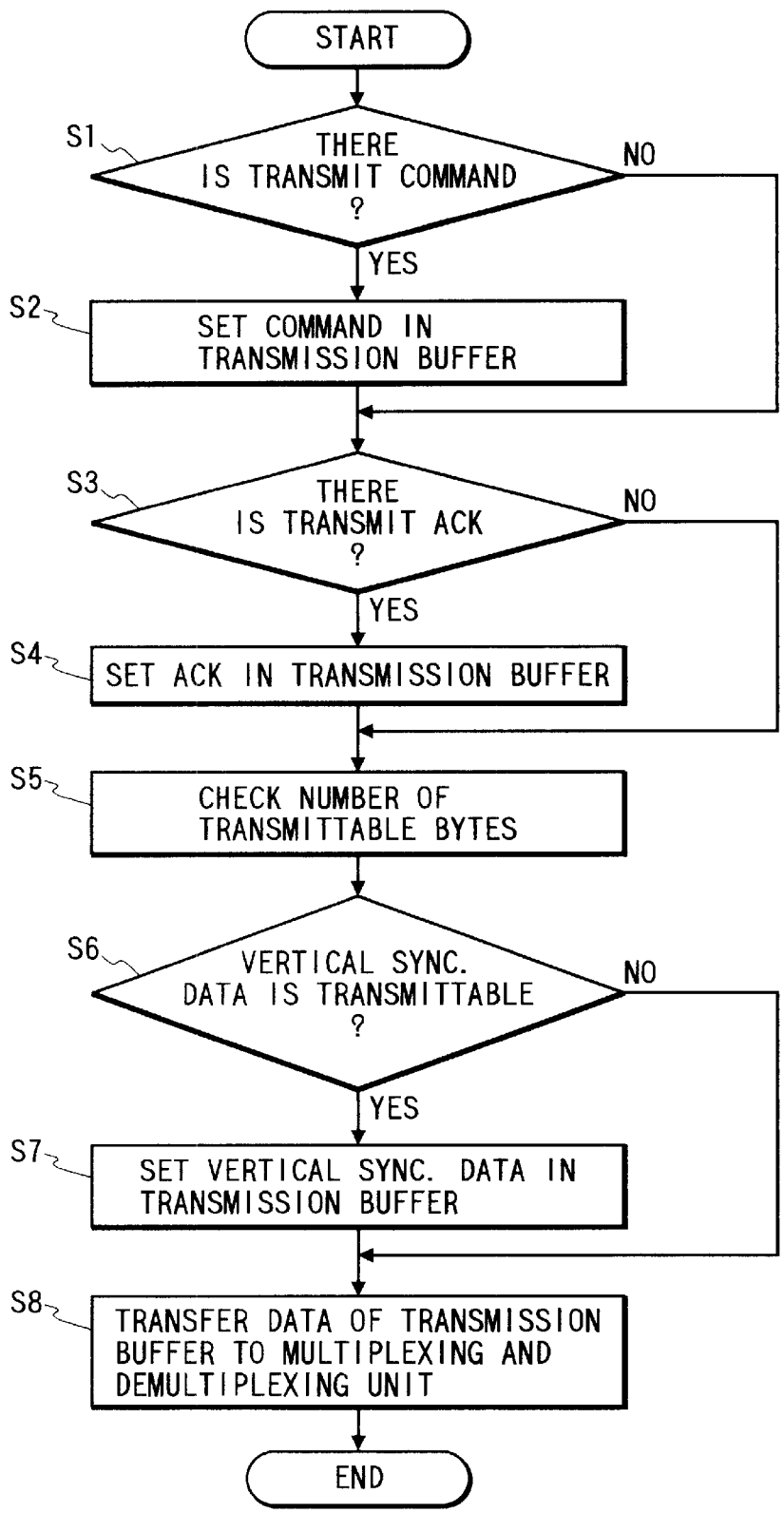

INFORMATION TRANSMISSION METHOD AND APPARATUS

BACKGROUND OF THE INVENTION

1. Field of the Invention

The present invention relates to an information transmission method and apparatus for multiplexing data indicating information other than video information on a video signal, and transmitting the multiplexed data.

2. Related Background Art

A conventional system, which transmits a signal obtained by multiplexing data such as character data on a video signal, and receives and demultiplexes such signal into the video signal and data like in teletext broadcasting, is known.

However, the conventional system multiplexes modulated data on a specific interval (a portion of the vertical blanking interval) of a video signal, and the receiving side demodulates the specific interval alone to obtain data. More specifically, the modulation speed, the interval to be multiplexed, and the like of data are predetermined, and cannot be changed depending on the data volume, quality of line, and the like.

The arrangement of a video input apparatus shown in FIG. 1 will be described below as an example of a conventional information transmission system. A single-focus camera unit 100 serving as a video input unit is connected to an image processing unit 200 serving as a video processing unit. The image processing unit 200 is connected to a host unit 400 via a bus interface 208. The host unit 400 controls the image processing unit 200 and the single-focus camera unit 100 via the bus interface 208.

The arrangement of the single-focus camera unit 100 will be explained below. A system control unit 106 comprises a one-chip microcomputer having functions of a CPU, ROM, RAM, control port, communication port, and the like. The system control unit 106 controls the individual devices in the single-focus camera unit to make two-way communications with the image processing unit 200, and interprets commands as control data from the host unit 400 to execute operations requested by the host unit 400.

A lens unit 101 comprises a phototaking lens, focusing lens, and a focusing ring for manually moving the focusing lens. An iris unit 102 adjusts the amount of incident light that passes through the lens unit 101, and comprises an iris and an iris ring for manually moving the iris. An image sensing element 103 such as a CCD photoelectrically converts an image obtained via the lens unit 101 and the iris unit 102 into an electrical signal. An image sensing element driving circuit 105 such as a TG controls accumulation, reading, and resetting of the image sensing element 103 in correspondence with the number of pixels of the element 103. When the driving circuit 105 is controlled by the system control unit 106 via a control signal 110, the shutter speed can be changed. A synchronization signal generation circuit 108 such as an SSG generates video synchronization signals 112 such as a horizontal synchronization signal (HD), vertical synchronization signal (VD), video clocks, and the like on the basis of the clocks generated by the image sensing element driving circuit (TG) 105. An S/H·AGC circuit 104 performs sampling and holding to reduce noise in charges accumulated in the image sensing element 103, and adjusts the gain of a video signal 114. The S/H·AGC circuit 104 outputs the video signal 114. When the S/H·AGC circuit 104 is controlled by the system control unit 106 via a control signal 111, it adjusts the gain of the video signal 114. A data multiplexing and demultiplexing unit 115 multiplexes the video signal 114 and control data from the system control unit 106, and transmits multiplexed data to the image processing unit 200. Also, the data multiplexing and demultiplexing unit 115 demultiplexes data from the image processing unit 200 and supplies the demultiplexed data to the system control unit 106. A data line & data control line 113 are used for two-way data communications between the single-focus camera unit 100 and the image processing unit 200, and are connected between the serial communication port of the system control unit 106, and the data multiplexing and demultiplexing unit 115. A connector 107 can be detached from the cable 109.

The video processing unit 200 will be described below. A system control unit 250 comprises a one-chip microcomputer having functions of a CPU, ROM, RAM, control port, communication port, and the like. The system control unit 250 performs control of the individual devices in the image processing unit 200, auto white balance control, communications with the single-focus camera unit 100, and communications with the host unit 400 via the bus interface 208. Also, the system control unit 250 interprets commands as control data from the host unit 400 and executes operations requested by the host unit 400.

A data multiplexing and demultiplexing unit 231 demultiplexes a video/data multiplexed signal 232 which multiplexes a video signal and data signal into a video signal 217 and a control data signal 222. Also, the data multiplexing and demultiplexing unit 231 multiplexes data from the system control unit 250 into a signal within the vertical synchronization interval, and transmits the signal to the single-focus camera unit 100.

An A/D conversion circuit 201 converts the video signal 217 transmitted from the single-focus camera unit 100 via the cable 109 into a digital signal 218. A signal processing circuit 202 performs processing for converting the converted digital video signal 218 into a standardized digital video signal 219. The signal processing circuit 202 generates an interrupt signal for informing the system control unit 250 of white balance data for white balance control. Upon recognizing the interrupt, the system control unit 250 reads out such information (white balance data, and the like) via a serial data line 223, and writes them in its RAM area.

An encoder circuit 204 converts the standardized digital video signal 219 into a multiplexed composite signal 221, and outputs the composite signal to a video output connector 210. An image memory 206 stores digital video signals 216 and 213 from the signal processing circuit 202 and an SRC (scan rate converter circuit) 207. A memory controller circuit 205 controls reads/writes in/from the image memory 206. The SRC 207 converts and absorbs the difference between the aspect ratios of the digital video signal 213 of the image processing unit 200 and a digital video signal 214 of the host unit 400. A switch circuit 203 selects an output signal 225 to the encoder 204 from a digital video signal 219 of the signal processing circuit 202 and the digital video signal 216 of the image memory 206, and is controlled by the system control unit 250 via a control line 224. The bus interface 208 is connected to the bus of a computer as the host unit 400. The bus interface 208 performs data communications of the digital video signal 214 and control data 226 between the host unit 400 and the image processing unit 200, and allows the host unit 400 to control the memory controller 205 and the SRC 207.

Video synchronization signals 215 of the image processing unit 200 correspond to the video synchronization signals 112 of the single-focus camera unit 100, and provide video synchronization signals to the signal processing circuit 202, the memory controller 205, and the encoder 204.

A serial data line & serial data control unit 222 are used for performing two-way data communications between the single-focus camera unit 100 and the image processing unit 200, and are connected to the serial data port of the system control unit 250.

A parallel data line & control unit 226 are used for performing two-way data communications between the host unit 400 and the image processing unit 200, and are connected to the control port of the system control unit 250.

FIG. 2 shows the transmission sequence of data 10 during the vertical blanking interval between the single-focus camera unit 100 and the image processing unit 200. A vertical synchronization interval Vhd tconsists of a vertical blanking interval $V_b$ and an effective video interval $V_a$. Each data 10 is multiplexed on a video signal during the vertical blanking interval $V_b$.

When data communications are to be made between the single-focus camera unit 100 and the image processing unit 200, the length of data that can be transmitted within one vertical blanking interval $V_b$ is limited.

In the case of FIG. 1, when the image processing unit 200 transmits control data such as command data and ACK data to the single-focus camera unit 100 within one vertical synchronization interval $V_t$, a maximum of 19 bytes=16 bytes (command data)+3 bytes (ACK data) must normally be transmitted. In this case, since this number of bytes is smaller than 32 bytes as the maximum number of bytes that can be transmitted within a single vertical blanking period $V_b$, all the data can be transmitted.

However, in the case of a zoom head which requires a large information volume to be transmitted, when vertical synchronization data generated for each synchronization interval is to be transmitted together with control data such as command data and ACK data, a maximum of 45 bytes=16 bytes (command data)+3 bytes (ACK data)+26 bytes (vertical synchronization data) must be transmitted. This number of bytes exceeds 32 bytes as the maximum number of bytes that can be transmitted within a single vertical blanking period $V_b$.

In this manner, when auto-focusing or automatic exposure is performed in a zoom camera unit, since the image processing unit 200 transmits data required for such control to the zoom head for each vertical blanking interval $V_b$, the volume of data to be transmitted increases. In the apparatus in which the density of the volume of information to be transmitted is high, data transmission cannot be completed within a single vertical blanking interval $V_b$.

SUMMARY OF THE INVENTION

It is an object of the present invention to provide an information transmission method and apparatus, which can solve the above-mentioned problems.

It is another object of the present invention to provide an information transmission apparatus which can realize a function of multiplexing data on a video signal in accordance with the data format used and transmitting multiplexed data, with an inexpensive, simple, and small-scale circuit arrangement.

In order to achieve the above objects, according to one embodiment of the present invention, an information transmission apparatus for multiplexing data indicating information other than video information on a video signal and transmitting the multiplexed data, comprises modulation means for forming modulated data by inputting the data and modulating the input data, and outputting the formed modulated data, multiplexing means for inputting the video signal and the modulated data output from the modulation means, multiplexing the modulated data on the input video data, and outputting the multiplexed data, and control means for controlling a modulation mode in the modulation means or a multiplexing interval of the modulated data in the multiplexing means in accordance with a type of data input to the modulation means.

It is still another object of the present invention to provide an information transmission apparatus which can efficiently transmit data together with a video signal.

In order to achieve the above object, according to one embodiment of the present invention, an information transmission apparatus for multiplexing data indicating information other than video information on a video signal and transmitting the multiplexed data, comprises transmission means for multiplexing and transmitting control data in a vertical blanking interval of the video signal in an identifiable state, and control means for controlling the transmission means to preferentially multiplex and transmit the control data when the transmission means has data to be multiplexed and transmitted in the vertical blanking interval in addition to the control data, and to multiplex and transmit the data, which cannot be multiplexed in the vertical blanking interval, during an interval other than the vertical blanking interval.

It is still another object of the present invention to provide an information transmission method which can efficiently transmit data together with a video signal.

In order to achieve the above object, according to one embodiment of the present invention, an information transmission method for multiplexing data indicating information other than video information on a video signal and transmitting the multiplexed data, comprises the transmission step of multiplexing and transmitting control data in a vertical blanking interval of the video signal in an identifiable state, and the control step of controlling a transmission operation in the transmission step to preferentially multiplex and transmit the control data when there is in the transmission step data to be multiplexed and transmitted in the vertical blanking interval in addition to the control data, and to multiplex and transmit the data, which cannot be multiplexed in the vertical blanking interval, during an interval other than the vertical blanking interval.

Other objects and features of the present invention will become apparent from the following detailed description of the embodiments of the present invention taken in conjunction with the accompanying drawings.

BRIEF DESCRIPTION OF THE DRAWINGS

FIG. 3 is a block diagram showing an information transmission apparatus according to the first embodiment of the present invention;

FIG. 4 is a block diagram showing the arrangement of a modulation unit and a demodulation unit shown in FIG. 3;

FIGS. 5A and 5B are timing charts for explaining the operation of the arrangement shown in FIG. 4;

FIGS. 9A and 9B are explanatory views showing the transmission sequence of command data, in which FIG. 9A is an explanatory view showing the transmission sequence between a host unit and the video processing unit, and FIG. 9B is an explanatory view showing the transmission sequence between the video processing unit and a camera unit;

FIG. 10 is an explanatory view showing the transmission sequence of vertical synchronization data;

FIG. 13 is a flow chart showing the transmission operation of a system control unit to the camera unit.

DETAILED DESCRIPTION OF THE PREFERRED EMBODIMENTS

Figure 1:
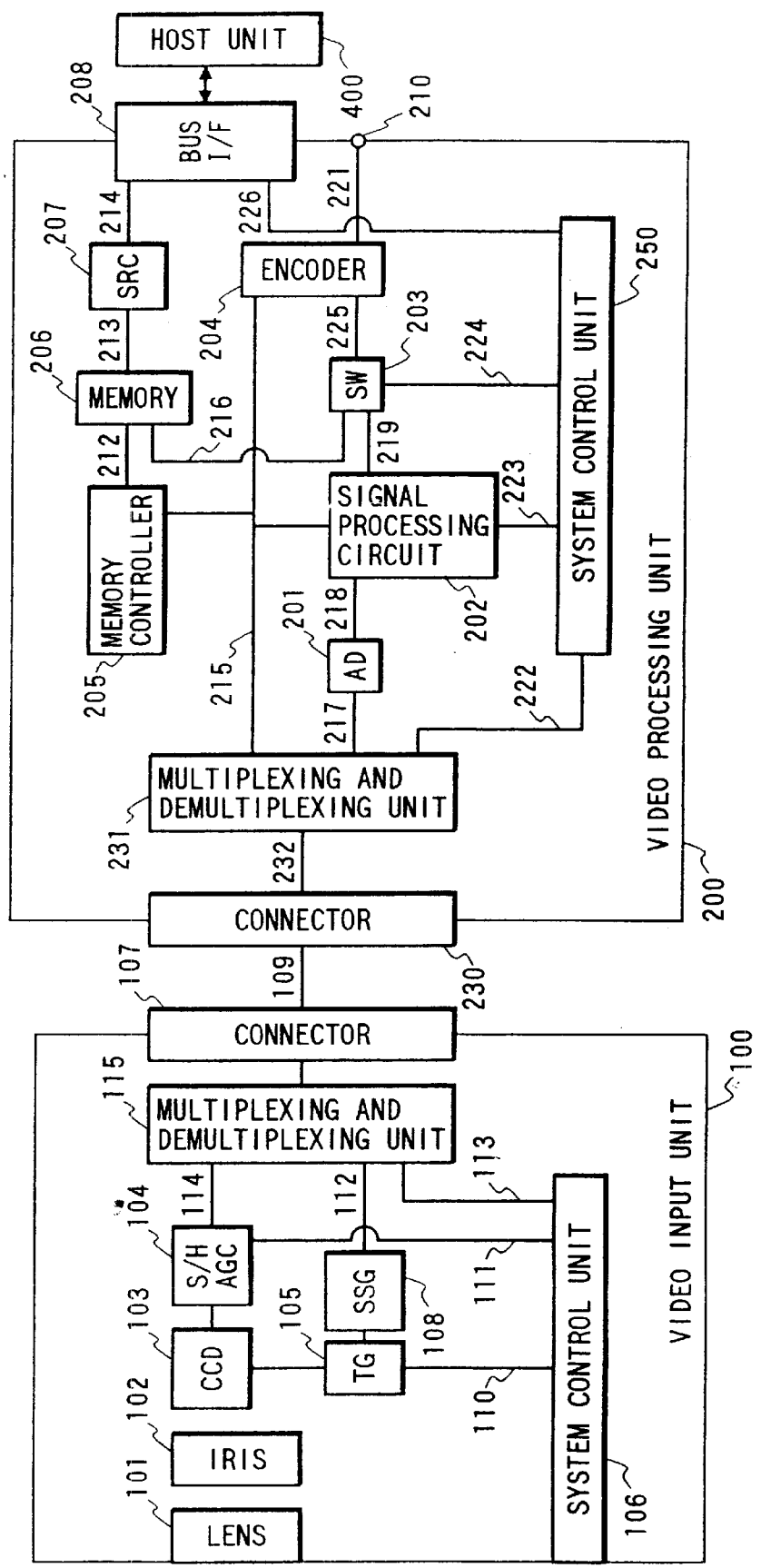
FIG. 1 is a block diagram showing an example of the arrangement of a conventional information transmission system.

FIG. 3 is a block diagram showing an information transmission apparatus according to the first embodiment of the present invention.

Referring to FIG. 3, a transmitting terminal 10 and a receiving terminal 20 are connected via a transmission line 1. The transmitting terminal 10 comprises a camera 11, a control CPU 12, a data modulation unit 13 (including a modulation control unit), a signal multiplexing unit 14, and an output unit 15. The receiving terminal 20 comprises a reception unit 21, a signal separation unit 22, a monitor 23, a demodulation unit 24 (including a demodulation control unit), and a control CPU 25.

The operation will be described below.

In the transmitting terminal 10, a video signal sensed by the camera 11 is supplied to the multiplexing unit 14. On the other hand, data generated by the CPU 12 is modulated by the modulation unit 13, and the modulated data signal is supplied to the multiplexing unit 14. The modulated data signal is multiplexed on the video signal, and the multiplexed signal is output onto the transmission line 1 via the output unit 15. Note that the modulation speed, modulation timing, and the like of data are set under the control of the CPU 12.

In the receiving terminal 20, the signal received from the transmission line 1 via the reception unit 21 is separated into the video signal and the modulated data signal by the signal separation unit 22. The video signal is input to and displayed on the monitor 23. The modulated data signal is input to the demodulation unit 24 and is demodulated. The demodulated data is supplied to the CPU 25. Note that the demodulation speed, demodulation timing, and the like of data are set under the control of the CPU 25, and the modulated data is demodulated according to them.

FIG. 4 is a block diagram showing the arrangement of the modulation unit 13 (including the modulation control unit) and the demodulation unit 24 (including the demodulation control unit) shown in FIG. 3. Note that the arrangement shown in this block diagram is used by a terminal which integrates the transmitting terminal 10 and the receiving terminal 20 shown in FIG. 3, and a common CPU is used as the CPUs 12 and 25. In FIG. 4, the modulation and demodulation unit comprises a CPU interface 1101, an address generator 1102, transmission and reception buffers 1103, a modulation control unit 1104, a CRC addition unit 1105 for adding a CRC check code, a demodulation control unit 1106, and a CRC detection unit 1107 for detecting CRC errors.

The operation will be described below.

The CPU interface 1101 exchanges commands, data, status, and the like with the control CPU. The CPU sets commands of the modulation speed and modulation timing (modulation line and the like) in the modulation control unit 1104 via the CPU interface 1101 to generate signals such as a control signal (TXVIDS gate) and the like in synchronism with vertical and horizontal synchronization signals TxVD and TxHD, a clock signal TxCLK, and the like. Transmission data input from the CPU is temporarily stored in the transmission buffer 1103 in accordance with the address generated by the address generator 1102. Thereafter, the transmission data is read out by the address generator 1102 in accordance with the control signal from the modulation control unit 1104, and a CRC code is added to the readout data by the CRC addition unit 1105, thus outputting the sum data as data VIDSTx.

On the receiving side, the CPU sets commands of the demodulation speed and demodulation timing (demodulation line and the like) in the demodulation control unit 1106 via the CPU interface 1101 to generate signals such as a reception control signal (RxVIDS gate) and the like in synchronism with reception synchronization signals such as vertical and horizontal synchronization signals RxVD and RxHD, a clock signal RxCLK, and the like. The modulated data signal VIDSRx separated by the signal separation unit 22 is input to the CRC detection unit 1107 to check the presence/absence of errors, and thereafter, is temporarily stored in the reception buffer 1103 in accordance with the address generated by the address generator 1102. The received data is then read out upon designation of the address generator 1102 via the CPU interface 1101.

Note that the CPU independently sends commands to the modulation control unit 1104 and the demodulation control unit 1106 via the CPU interface 1101 to modulate and demodulate data in an arbitrary line.

FIGS. 5A and 5B are timing charts for explaining the operation of the arrangement shown in FIG. 4.

In FIG. 5A, a, b, and c respectively indicate a composite synchronization signal Csync, a control signal TxVIDS gate in the vertical blanking interval (Vdelay, Vwidth), and a video signal multiplexed with data. As can be seen from FIG. 5A, data is modulated in synchronism with the synchronization signal of the video signal, and the modulated data signal is multiplexed on the video signal. The data modulation and multiplexing interval (the range of lines) is set in correspondence with the synchronization signal of the video signal, as shown in FIG. 5A. In FIG. 5B, d and e represent the relationship between data multiplexed on one horizontal line of the video signal and other signals. Note that, for example, PCM modulation is used as the data modulation scheme, but any other modulation schemes may be used.

The same applies to the demodulation timings.

Figure 6:
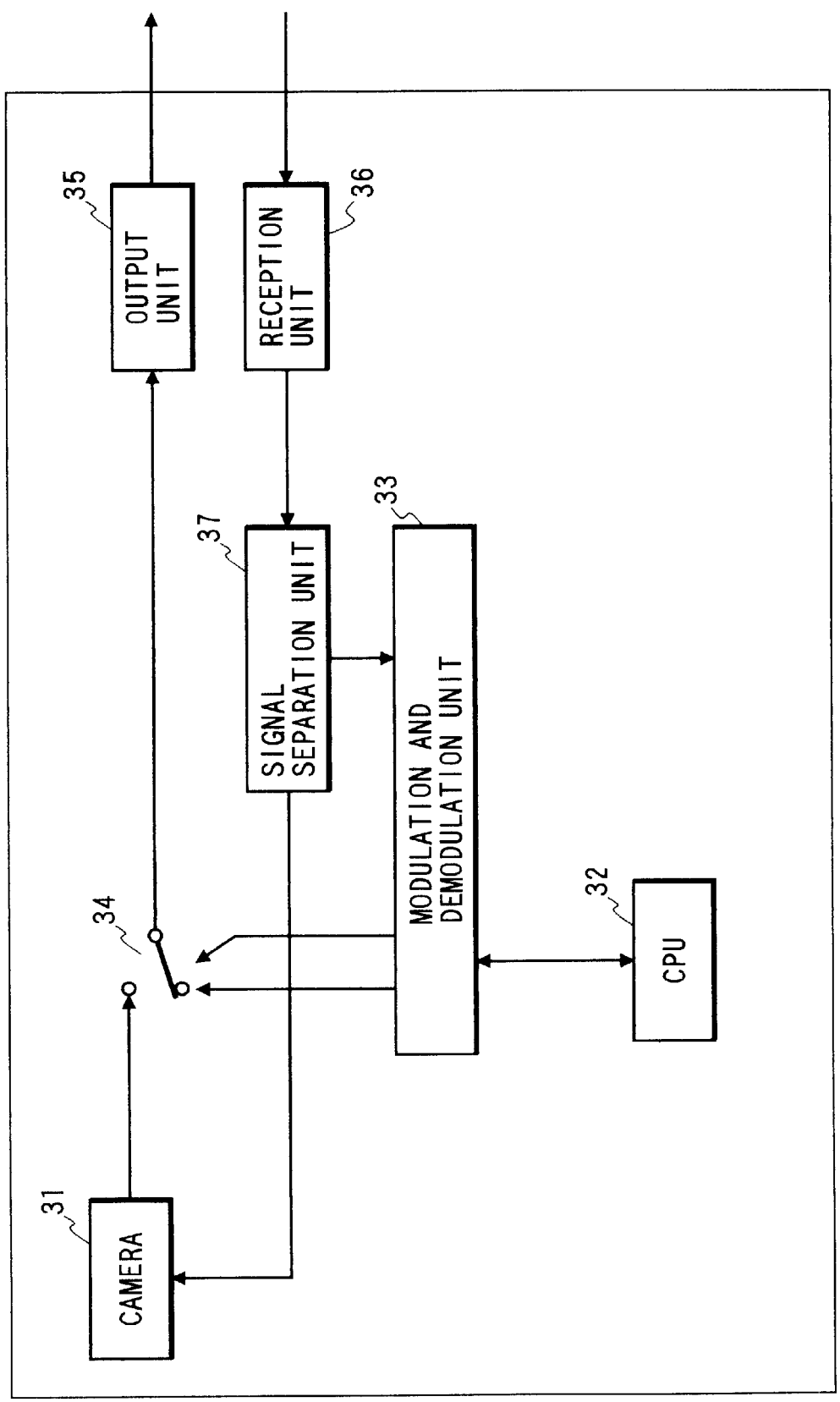
FIG. 6 is a block diagram showing an information transmission apparatus according to the second embodiment of the present invention.

FIG. 6 shows an information transmission apparatus according to the second embodiment of the present invention, and illustrates a terminal that can attain external synchronization.

The terminal shown in FIG. 6 comprises a camera 31, a control CPU 32, a modulation and demodulation unit 33 (including modulation and demodulation control units), a multiplexing unit 34, an output unit 35, a reception unit 36, and a signal separation unit 37.

The operation will be explained below.

A video signal input by the camera 31 is supplied to the multiplexing unit 34. On the other hand, data generated by the CPU 32 is modulated by the modulation and demodulation unit 33, and the modulated data signal is time-division-multiplexed with the video signal while these signals are switched by the multiplexing unit 34. The multiplexed signal is output from the output unit 35.

A signal transmitted from another terminal is input from the reception unit 36, and is separated into a video signal (a composite synchronization signal in this case) and a modulated data signal by the signal separation unit 37. The modulated data signal is demodulated by the modulation and demodulation unit 33, and the demodulated data is input to the CPU 32. The separated video signal (composite synchronization signal) is input to the camera 31 to attain external synchronization of the camera 31.

Since the signal to be output from this terminal includes the video signal input by the camera 31, the data section where data can be multiplexed is limited to the vertical blanking interval of the video signal. In contrast to this, since the received signal is a composite synchronization signal (black burst signal and the like) for attaining external synchronization of the camera 31, the interval in which data can be multiplexed is not limited to the vertical blanking interval, and data can be multiplexed in the entire section except for the vertical blanking interval. Such processing can be attained by independently setting the modulation and demodulation control units included in the modulation and demodulation unit 33.

Furthermore, as the third embodiment, since communications can be made while setting an arbitrary data multiplexing section, the data multiplexing section can be dynamically changed after negotiation during communications.

In the above description, the reception section on the receiving side is set by the demodulation control unit. Alternatively, a section setting unit may be arranged in the signal separation unit, and data to be supplied to the demodulation unit may be separated from only the set section.

As described above, according to the above embodiments, at least one of the modulation speed and the multiplexing interval can be controlled upon modulating data and multiplexing the modulated data on the video signal on the transmitting side. On the receiving side, upon demultiplexing and demodulating the multiplexed data, the multiplexed data is demultiplexed by controlling the demodulation speed and the demultiplexing interval. Therefore, according to the present invention, the modulation and demodulation speeds can be controlled and the data communication section can be dynamically assigned in correspondence with the system requirements, generated data volume, quality of line, and the like.

Figure 2:
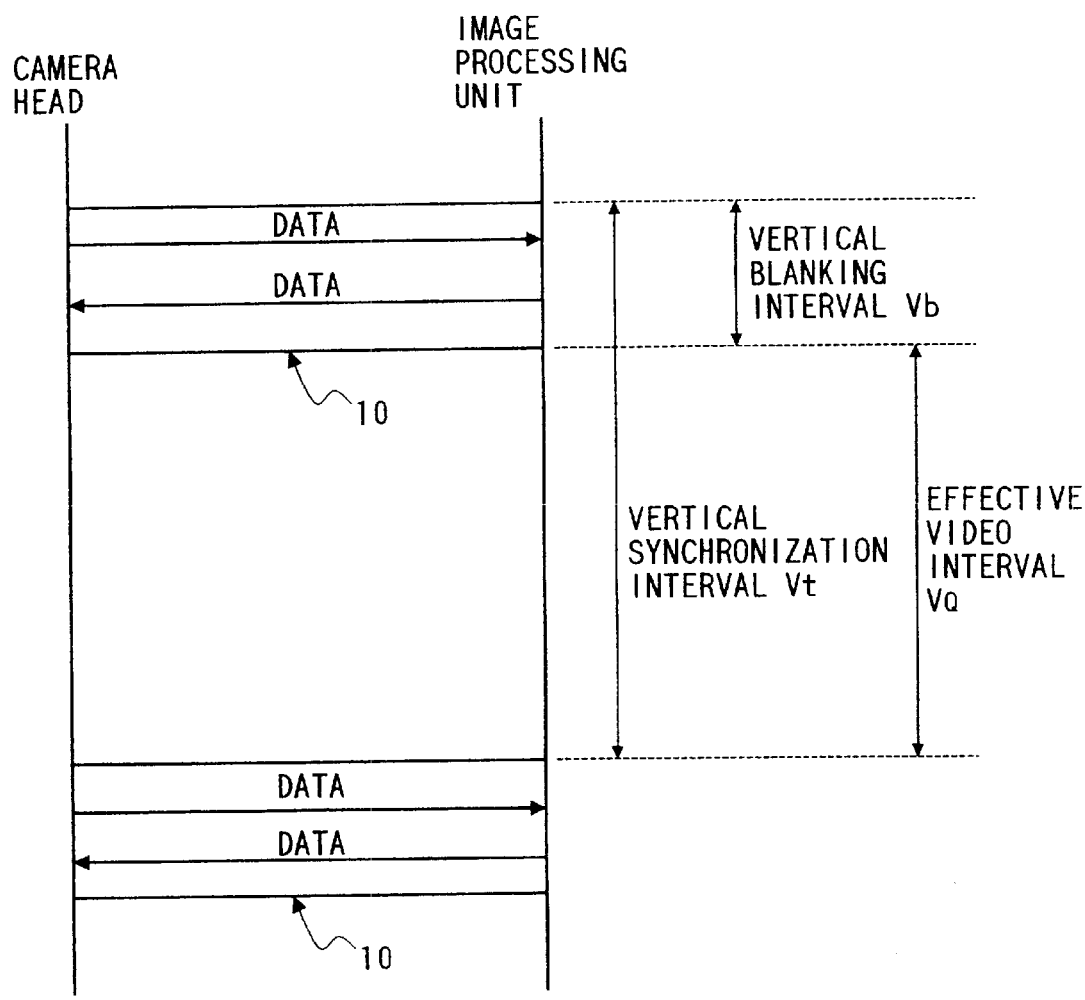
FIG. 2 is an explanatory view of the data transmission sequence in the conventional information transmission system.
Figure 7:
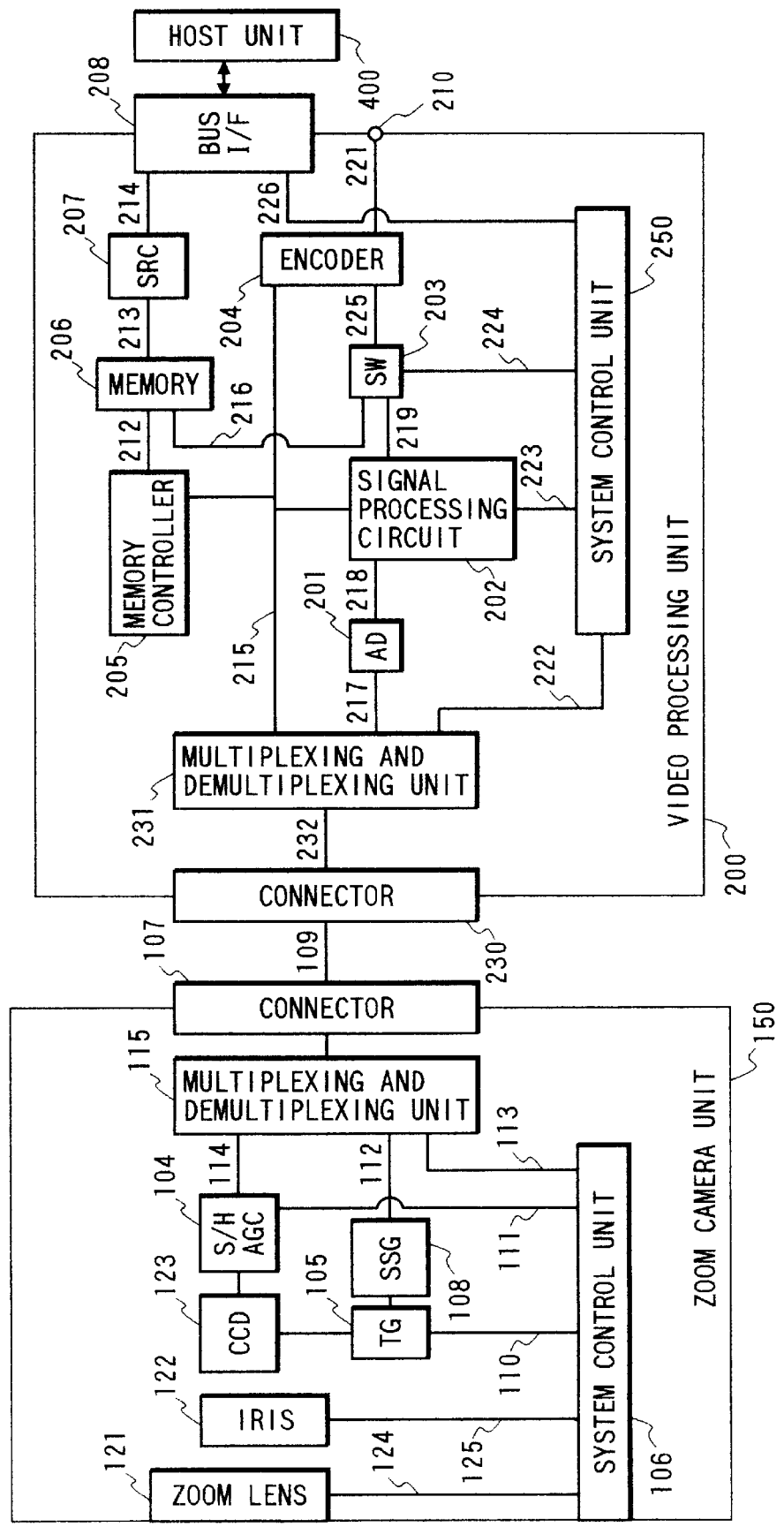
FIG. 7 is a block diagram showing the arrangement of a video input apparatus according to the fourth embodiment of the present invention.

The fourth embodiment of the present invention will be described below. FIG. 7 shows the arrangement of a video input apparatus according to the fourth embodiment of the present invention. Note that the same reference numerals in FIG. 7 denote the same parts as in FIGS. 1 and 2 above, and a detailed description thereof will be omitted.

A lens unit 121 comprises a phototaking lens, a focusing lens, a zoom motor for moving a focusing ring, a zoom lens, and a zoom motor for moving a zoom ring. When the lens unit 121 is controlled by a system control unit 106 via a control line 124, powered zooming and auto-focusing can be realized. An iris unit 122 adjusts the amount of incident light that passes through the lens unit 121, and comprises an iris and an iris motor for moving an iris ring. When the iris unit 122 is controlled by the system control unit 106 via a control line 125, the iris can be open/close-controlled. The system control unit 106 can attain automatic exposure by maintaining the brightness data of an object transmitted from a video processing unit 200 constant by controlling the iris, shutter speed, and AGC gain. An image sensing element 123 such as a CCD photoelectrically converts an image obtained via the lens unit 121 and the iris unit 122 into an electrical signal.

The difference between the video processing unit 200 of this embodiment and the conventional one will be explained below. In order to realize auto-focusing and automatic exposure, data required for such control must be read out from a signal processing circuit 202 and must be transmitted to a zoom camera unit 150.

The signal processing circuit 202 generates an interrupt signal and supplies it to a system control unit 250 so as to inform the system control unit 250 of synchronization data such as brightness data of the object used in exposure control, white balance data for white balance control, in-focus data for focusing control, and the like. Upon recognizing the interrupt signal, the system control unit 250 reads out such information via a serial data line 223, and writes the readout information in its RAM 254. Also, the system control unit 250 transmits synchronization data such as the brightness data of the object for automatic exposure, in-focus data for focusing control, and the like to the zoom camera unit 150 during the vertical blanking interval.

Figure 8:
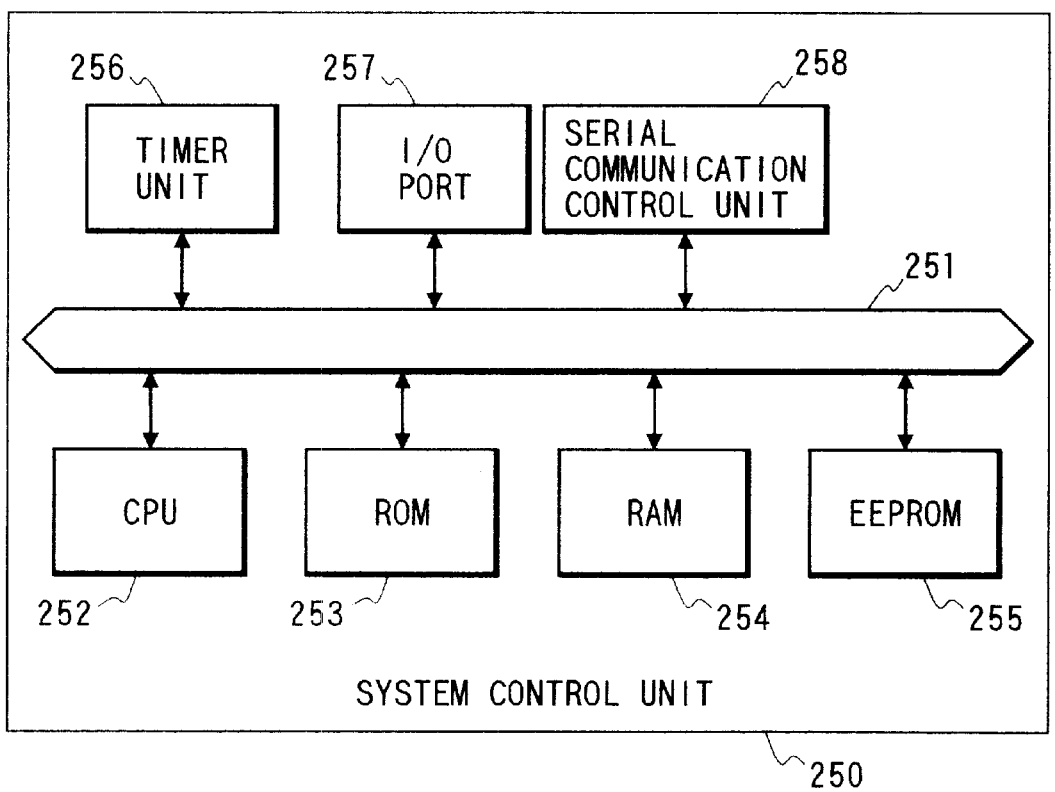
FIG. 8 is a block diagram showing the arrangement of a system control unit in a video processing unit shown in FIG. 7.

FIG. 8 is a block diagram of the system control unit 250. The system control unit 250 comprises a one-chip microcomputer and a software program for controlling the microcomputer. A CPU 252 is connected to an internal bus 251. A ROM 253 stores the software program, and a RAM 254 is used as the work area of the software program. A rewritable ROM (EEPROM) 255 stores data necessary for control. A timer unit 256 is connected to the internal bus 251. An I/O control unit (I/O port) 257 controls various devices. A serial communication port (serial communication control unit) 258 performs command communications between the zoom camera unit 150 and a host computer 400, and also performs serial communications with the individual devices in the image processing unit 200 to control these devices.

Host control data D5 as control data exchanged between the host unit 400 and the image processing unit 200 and between the host unit 400 and the zoom camera unit 150 will be described below with reference to FIGS. 9A and 9B.

A request command D6 requests an operation. A response command D7 is a response to the request command D6, and is sent back when the requested operation has ended. ACK data D8 is a frame for informing the transmitting side that the command has been normally received.

Figure 9A:
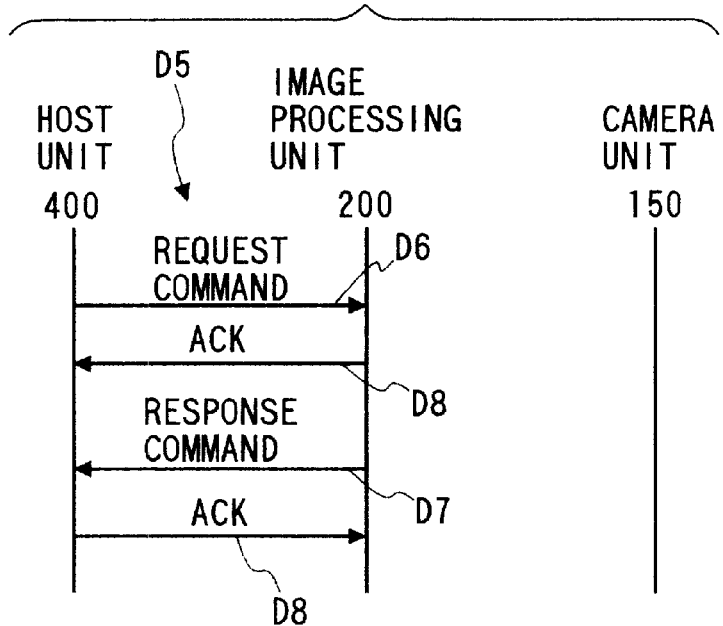

FIG. 9A shows the sequence when the host unit 400 requests an operation to the image processing unit 200. Upon reception of the request command D6 from the host unit 400, the image processing unit 200 executes the requested command, and transmits the response command D7 to the host unit 400 upon completion of execution.

Figure 9B:
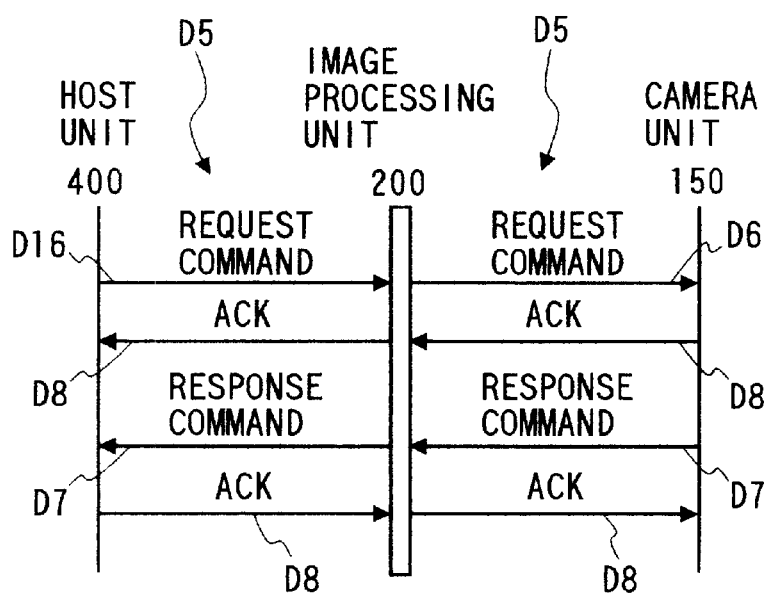

FIG. 9B shows the sequence when the host unit 400 requests an operation to the zoom camera unit 150. When the command received from the host unit 400 is addressed to the zoom camera unit 150, the image processing unit 200 transfers the command to the zoom camera unit 150. On the other hand, when the command received from the zoom camera unit 150 is addressed to the host unit 400, the image processing unit 200 transfers the command to the host unit 400.

Command data D6 and D7 and ACK data D8 exchanged between the image processing unit 200 and the zoom camera unit 150 are produced when the host unit 400 controls the zoom camera unit 150. For this reason, host control data D5 such as the command data D6 and D7, the ACK data D8, and the like are generated not in synchronism with each vertical synchronization interval but intermittently under the control of the host unit 400 in this case.

FIG. 10 shows the sequence of vertical synchronization data D13 as synchronization data.

The vertical synchronization data D13 is transmitted from the image processing unit 200 to the zoom camera unit 150 for each vertical synchronization interval. The image processing unit 200 transmits the vertical synchronization data D13 such as in-focus data, brightness data, and the like to the zoom camera unit 150 for each vertical synchronization interval.

The frame formats of command data D11, control data of ACK data D12, and the vertical synchronization data D13 will be described below with reference to FIGS. 11A, 11B and 11C.

Figure 11A:
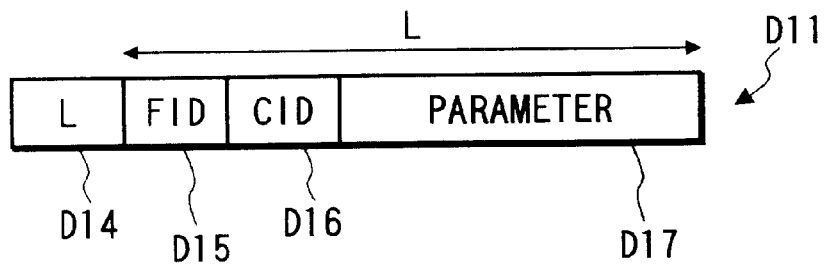
FIG. 11A is an explanatory view showing the frame format of command data.

FIG. 11A shows the frame format of the command data D11. A frame length L (length) D14 indicates the number of bytes that make up the data. A frame identifier FID D15 is used for identifying the frame attribute. A command identifier CID D16 is used for identifying the command type. A parameter D17 is determined in correspondence with the command. The command frame has a variable length; its minimum length is 3 bytes and the maximum length, 16 bytes.

Figure 11B:
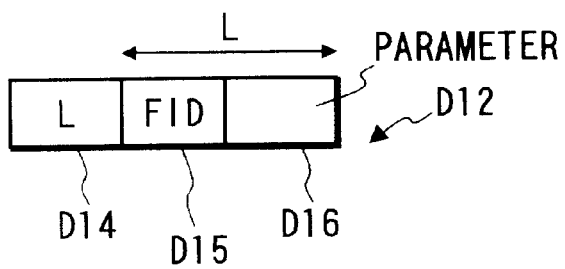
FIG. 11B is an explanatory view showing the frame format of ACK data.

FIG. 11B shows the frame format of the ACK data D12. In the ACK data D12, a frame length L D14 is fixed at 2 bytes. A frame identifier FID D15 assumes a fixed value "80h". When a parameter D16 is "00h", it indicates that the frame has been normally received; otherwise, it indicates that errors have occurred. The cause of errors is identified by the value of the parameter D16. The frame of the ACK data D12 has a fixed length of 3 bytes.

Figure 11C:
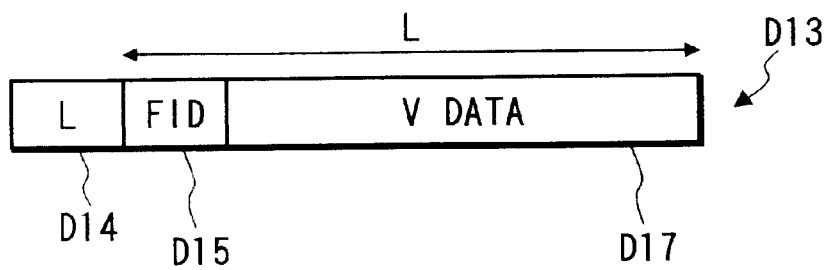
FIG. 11C is an explanatory view showing the frame format of vertical synchronization data.

FIG. 11C shows the frame format of the synchronization data D13. In the case of a zoom camera, the length of the frame to be transmitted from the image processing unit 200 to the zoom camera unit 150 is 26 bytes. V data includes the above-mentioned in-focus data and brightness data.

Figure 12A:
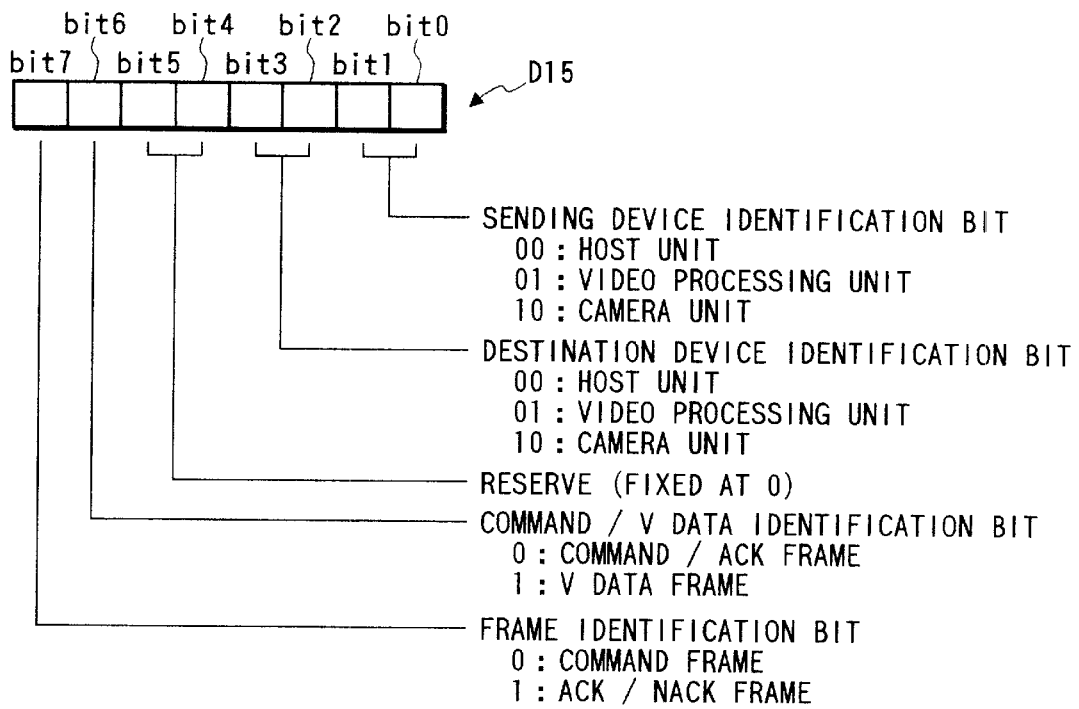
FIG. 12A is an explanatory view showing the format of a frame identifier.
Figure 12B:
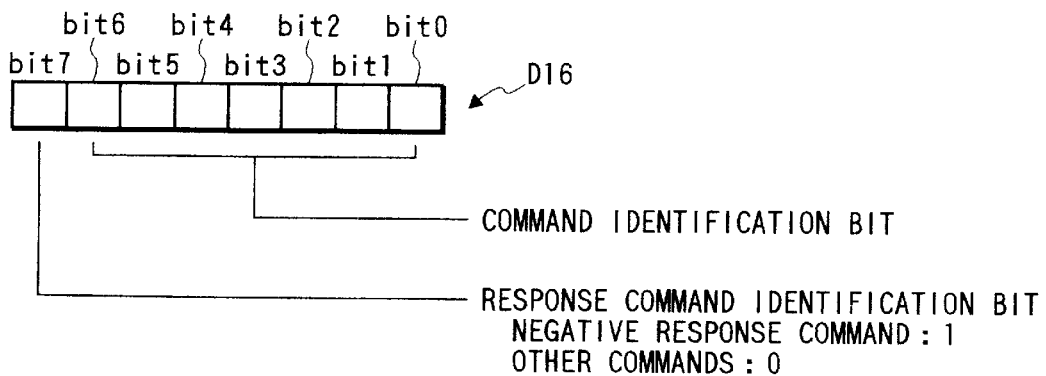
FIG. 12B is an explanatory view showing the format of a command identifier.

FIGS. 12A and 12B respectively show the formats of the frame identifier (FID) D15 and the command identifier (CID) D16. FIG. 12A shows the bit configuration of the FID D15. Bit 7 is used for identifying whether the frame is the frame of the command data D11 or that of the ACK data D12. Bit 6 is effective in the case of communications between the zoom camera unit 150 and the video processing unit 200, and is used for identifying the vertical synchronization data D13 or the host control data D5.

Bits 2 and 3 are destination device identification bits, and are used for designating the command destination. Bits 0 and 1 are sending device identification bits, and are used for designating the sending device of the command.

FIG. 12B shows the bit configuration of the CID D16. Bit 7 is effective in the case of the response command, and when the function indicated by the request command normally ends, it is set at "0"; otherwise, "1". A negative or positive response is distinguished using this bit. Bits 10 to 0 are command type bits, which specify the command type.

The signal processing circuit 202 transmits the vertical synchronization data D13 such as brightness data of the object and in-focus data written in the RAM area of the system control unit 250 to the zoom camera unit 150 for each vertical synchronization interval. Using the brightness data of the object, the zoom camera unit 150 realizes automatic exposure by controlling the shutter speed of an image sensing element driving circuit (TG) 105, the gain of an S/H·AGC circuit 104, and the iris ring of the iris unit 122. Also, the zoom camera unit 150 realizes auto-focusing by controlling the focusing ring of the zoom lens unit 121 using the in-focus data.

In this case, the length of data that can be transmitted from the image processing unit 200 to the zoom camera unit 150 per vertical synchronization interval is 32 bytes. The maximum frame length of the command data D11 is 16 bytes, and the data length of the frame of the ACK data D12 is 3 bytes. One vertical synchronization interval allows transmission of one frame each of the vertical synchronization D13, command data D11, and ACK data D12.

As has been described in the paragraphs of the prior art, in the case of the single-focus camera unit 100, a maximum of 19 bytes (=16 bytes+3 bytes) must be transmitted when the frames of the command data D11 and ACK data D12 are to be transmitted. This number of bytes is smaller than the maximum number of transmittable bytes (32 bytes) per vertical blanking interval. However, in the case of the zoom camera unit 150, when all the frame of the command data D11, the frame of the ACK data D12, and all the frames of the vertical synchronization data D13 are to be transmitted, a maximum of 45 bytes (=16 bytes+3 bytes+26 bytes) must be transmitted. This number of bytes exceeds the maximum number of transmittable bytes (32 bytes) per vertical blanking interval.

In view of this problem, when data are to be transmitted to the zoom camera unit 150, the command data D11 and ACK data D12 are preferentially sent during one vertical blanking interval, and the vertical synchronization data D13 is transmitted if possible. The command data D11 and ACK data D12 are intermittently generated under the control of the host unit 400. Although the vertical synchronization data D13 is generated for each vertical synchronization interval, if it is omitted halfway through the frame to transmit the command data D11 and ACK data D12, it has no serious influence on the automatic exposure and auto-focusing of the zoom camera unit 150.

The operation when the system control unit 250 of the image processing unit 200 transmits the frames of the command data D11, ACK data D12, and vertical synchronization D13 to the zoom camera unit 150 during one vertical blanking interval $V_b$ will be described below with reference to the flow chart in FIG. 13.

The image processing unit 200 checks if the destination device identification bits of the FID D15 in the frame header of the command data D11 received from the host unit 400 indicate that the command is to be sent to the zoom camera unit 150 (S1). If it is determined that there is command data D11 to be transmitted, the command data D11 is set in the transmission buffer to a multiplexing and demultiplexing unit 231 (S2). It is then checked if there is ACK data D12 to be transmitted (S3). If the command data D11 was received from the zoom camera unit 150 during the previous vertical blanking interval, the ACK data D12 need be transmitted. If the ACK data D12 need be transmitted, the ACK data D12 is set in the transmission buffer to the multiplexing and demultiplexing unit 231. It is checked if the transmission buffer to the multiplexing and demultiplexing unit 231 has a 26-byte free space required for transmitting the vertical synchronization data D13 (S5, S6). If the vertical synchronization data D13 can be transmitted, the vertical synchronization data D13 is set in the transmission buffer (S7); otherwise, the flow advances to step S8 without setting any data. Then, the data set in the transmission buffer is transmitted to the multiplexing and demultiplexing unit 231.

In this embodiment, the vertical blanking interval is exemplified as a synchronization interval, and transmission control of data is made in the priority order of host control data D5 and vertical synchronization data D13 within the vertical blanking interval. However, the present invention is not limited to this, and transmission control can be similarly made by assigning the priority order of data during the vertical blanking interval within the horizonal synchronization interval.

In the above embodiments, the present invention may be applied to either a system made up of a plurality of devices or an apparatus consisting of a single device. Also, in the above embodiments, the present invention may also be applied to the case wherein the invention is attained by supplying a program to the system or apparatus. In this case, by loading a storage medium that stores a program expressed by software for achieving the above embodiments to the system or apparatus, the system or apparatus can enjoy the effects of the information transmission method and apparatus of the above embodiments.

As described above, according to the above embodiments, by utilizing a blanking interval (vertical blanking interval or the like) in a synchronization interval (vertical synchronization interval or the like) of an information signal (video signal or the like), data are transmitted in accordance with the priority order of control data (command, ACK data, and the like) generated intermittently and synchronization data (white balance adjustment data and the like) generated for each synchronization interval. In addition, data which can be transmitted only partially within the blanking interval is not transmitted within the blanking interval, and the data which cannot be transmitted is transmitted using a free blanking interval in which the control data or the like, which is generated intermittently, is not transmitted. In this manner, even when the data length to be transmitted exceeds the maximum transmission length within one blanking interval, data can be transmitted efficiently, and information processing power can be improved.

In this case, since the control data is generated under the control of an external host device, transmission control can be efficiently attained from a remote place. In this manner, when the present invention is applied to, e.g., a video input device with a remote camera head, automatic exposure and auto-focusing with high processing power and excellent performance can be realized.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information processing apparatus for transmitting image information, comprising:

an image transmission unit which transmits an image inputted from an imaging apparatus;

a generation unit which generates control data to control said imaging-apparatus;

a data transmission unit which transmits data obtained by multiplexing the generated control data and a vertical synchronization signal; and a discrimination unit which discriminates whether a sum data amount of the generated control data and the vertical synchronization signal is transmitted in the blanking interval;

wherein when said discrimination unit discriminates that the sum data amount of the generated control data and the vertical synchronization signal is not transmittable in a blanking interval, said data transmission unit transmits the control data without using the vertical synchronization signal.

2. The apparatus according to claim 1, wherein the control data includes at least one of data for zoom adjustment of said imaging apparatus, data for exposure adjustment, data for white-balance adjustment and data for focal adjustment.

3. An information processing method for transmitting image info information, comprising the steps of:

transmitting an image inputted from an imaging apparatus;

generating control data to control said imaging apparatus;

transmitting data obtained by multiplexing the generated control data and a vertical synchronization signal; and discriminating whether a sum data amount of the generated control data and the vertical synchronization signal is transmitted in a blanking interval;

wherein when it is discriminated that the sum data amount of the generated control data and the vertical synchronization signal is not transmittable in the blanking interval, the control data is transmitted without using the vertical synchronization signal.

4. The method according to claim 3, wherein the control data includes at least one of data for zoom adjustment of said imaging apparatus, data for exposure adjustment, data for white-balance adjustment and data for focal adjustment.

* * * * *

UNITED STATES PATENT AND TRADEMARK OFFICE
CERTIFICATE OF CORRECTION

PATENT NO.    : 6,573,931 B1                                             Page 1 of 1
DATED         : June 3, 2003
INVENTOR(S)   : Hiroyuki Horii et al.

It is certified that error appears in the above-identified patent and that said Letters Patent is hereby corrected as shown below:

<u>Column 3,</u>
Line 16, "Vhd tconsists" should read -- $V_t$ consists --

<u>Column 6,</u>
Line 22, "(TXVIDS gate)" should read -- (TxVIDS gate) --

<u>Column 12,</u>
Line 30, "in a blanking" should read -- in the blanking --
Line 38, "image info information," should read -- image information, --

Signed and Sealed this

Second Day of December, 2003

JAMES E. ROGAN
*Director of the United States Patent and Trademark Office*